United States Patent [19]

Ruetz

[11] Patent Number: 5,129,782
[45] Date of Patent: Jul. 14, 1992

[54] TURBO-MACHINE SEALING DEVICE

[75] Inventor: Georg Ruetz, Immenstaad, Fed. Rep. of Germany

[73] Assignee: MTU Motoren-Und Turbinen-Union Friedrichshafen GmbH, Fed. Rep. of Germany

[21] Appl. No.: 499,307

[22] PCT Filed: Aug. 5, 1989

[86] PCT No.: PCT/DE89/00518
 § 371 Date: Jun. 19, 1990
 § 102(e) Date: Jun. 19, 1990

[87] PCT Pub. No.: WO90/02896
 PCT Pub. Date: Mar. 22, 1990

[30] Foreign Application Priority Data

Sep. 8, 1988 [DE] Fed. Rep. of Germany ....... 3830470

[51] Int. Cl.[5] .............................. F01D 11/00
[52] U.S. Cl. .................................. 415/111; 415/230; 277/3; 277/74; 277/167.5
[58] Field of Search ............ 415/110, 111, 112, 113, 415/170.1, 229, 230; 277/3, 74, 81 R, 167.5, 193

[56] References Cited

U.S. PATENT DOCUMENTS

| 3,199,877 | 8/1965 | Cuny | 277/29 |
| 3,961,867 | 6/1976 | Woollenweber | 415/170.1 |
| 4,447,062 | 5/1984 | Leicht | 277/3 |
| 4,526,387 | 7/1985 | Flower | 277/193 |
| 4,527,804 | 7/1985 | Spencer | 277/167.5 |

FOREIGN PATENT DOCUMENTS

| 0211071 | 12/1983 | Japan | 277/3 |
| 2076480 | 12/1981 | United Kingdom | 277/3 |

Primary Examiner—Edward K. Look
Assistant Examiner—Christopher M. Verdier
Attorney, Agent, or Firm—Evenson, Wands, Edwards, Lenahan & McKeown

[57] ABSTRACT

A sealing device has two circumferentially fixed sealing rings which, together with a common ring groove in a turbo-machine shaft for both sealing rings, result in a labyrinth seal between the sealing gas space and the lubricating-oil relief space and between the sealing gas space and the rotor disk space. In the event of a disturbance of the sealing gas supply, both sealing rings are supported at a gradation of a shaft lead-through bore which prevents a total wearing-out of the sealing rings.

2 Claims, 1 Drawing Sheet

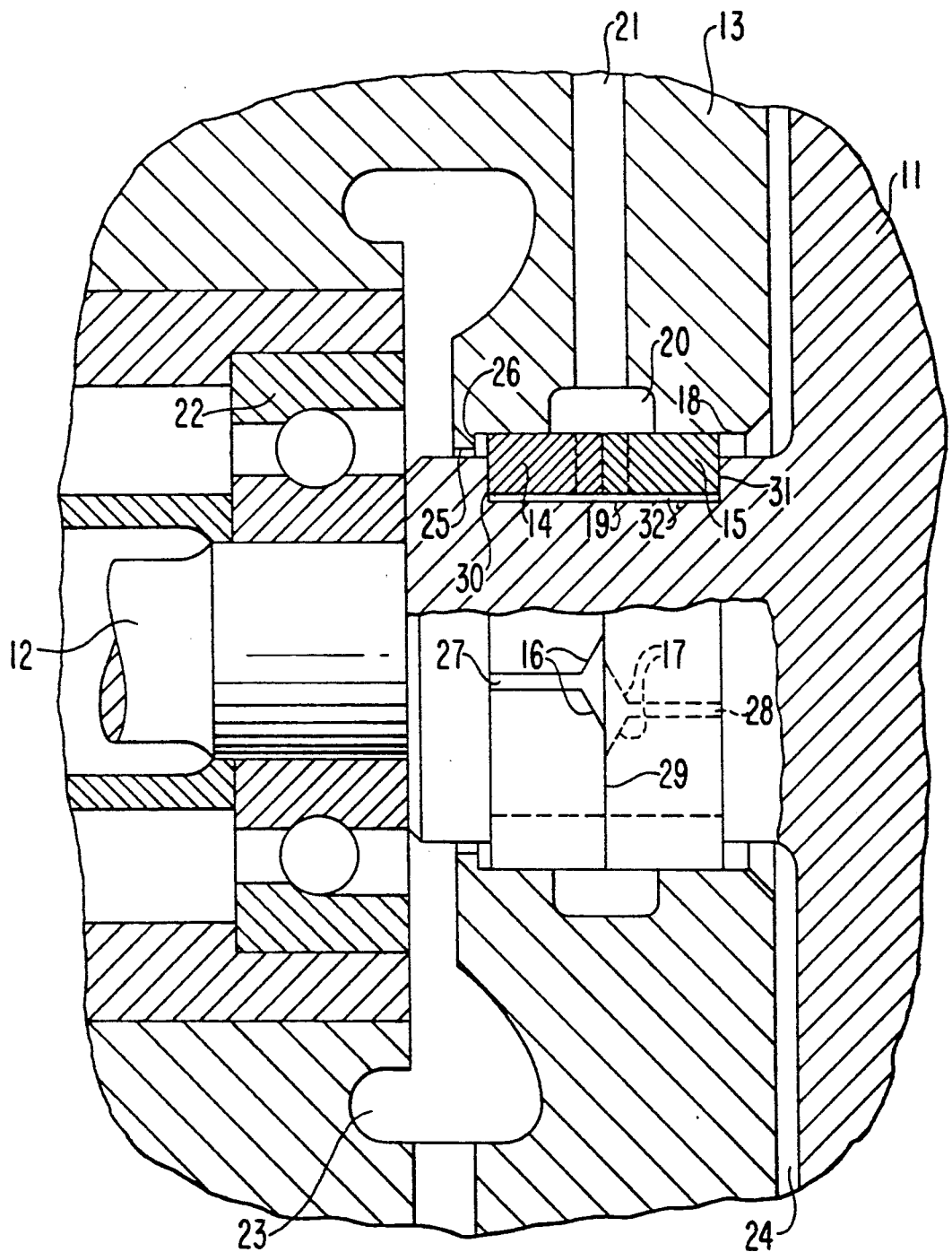

TURBO-MACHINE SEALING DEVICE

BACKGROUND AND SUMMARY OF THE INVENTION

The present invention relates to a sealing device between the shaft and the housing of a turbo-machine having at least one rotor disk and, more particularly, to a sealing device which incorporates a gradation of the shaft lead-through bore to avoid wear of the sealing rings.

A known sealing device used on turbo-machines utilizes sealing rings which do not move in the circumferential direction and, together with an assigned ring groove in the rotating shaft, form a labyrinth seal, for the purpose of preventing lubricating oil leaking out of the bearing points of the shaft and moving delivered medium from the rotor disk space into the bearing points.

Such a known sealing device is shown in DE 32 19 127 C2 in with the pressure in the sealing gas space presses one sealing ring against the lateral flank of its ring groove facing away from the rotor disk. After an initial wear at the sealing ring with respect to the lateral flank of the ring groove, the sealing ring is pushed against a rectangular gradation of the shaft lead-through bore and stops the wear at the sealing ring.

The conventional sealing ring which serves as a boundary of the sealing gas space with respect to the rotor risk space normally is axially balanced between the pressure in the sealing gas space and the pressure in the rotor disk duct without coming in contact with one of the lateral flanks of the ring groove so that no wear occurs at the ring.

During a malfunctioning of the sealing gas supply, however, the sealing ring adjacent to the rotor disk space is axially shifted toward the sealing gas space by the pressure of the delivered medium existing in the rotor disk space and places itself against the groove flank of the ring groove facing away from the rotor disk space. Since an axial stop for that sealing ring is absent in the shaft lead-through bore, the malfunctioning of the sealing gas supply results in a wear which endangers the operation and may result in a total loss of the sealing ring.

It is therefore an object of the present invention to provide a sealing device for bounding a sealing gas space between a shaft and a housing of a turbo-machine in which a wear of the sealing rings which endangers the turbo-machine operation is avoided, and the malfunctioning of the sealing gas supply is largely avoided.

The foregoing object has been achieved in accordance with the present invention by arranging two sealing rings next to one another in a common ring groove of the rotor disk shaft and at least one radial groove is provided on the sealing rings on lateral flanges thereof facing one another. The joint between the mutually opposite lateral flanks of the sealing rings is arranged in the area of a circumferential groove forming a sealing-gas distributing space.

Principal advantages achieved by the present invention include the fact that the sealing ring on the rotor disk side can be supported at the gradation of the shaft lead-through bore and, when the sealing gas pressure is insufficient, is protected from being worn down, which endangers the operation of the turbo-machine, and a simple mounting of the shaft with the inserted sealing rings lowers susceptibility to changing sealing gas pressure so that the identical design of the sealing ring lowers the costs. Furthermore, procurement and stockkeeping of spare parts is reduced, and, as a result of the common ring groove for both sealing rings, the number of grooves flanks to be machined is reduced and results in lower shaft manufacturing costs.

BRIEF DESCRIPTION OF THE DRAWINGS

These and further objects, features and advantages of the present invention will become more apparent from the following detailed description of a presently preferred embodiment when taken in conjunction with the accompanying sole figure which is a partial cross-sectional view of the sealing device of the present invention in a portion of a turbo-machine.

DETAILED DESCRIPTION OF THE DRAWINGS

A sealing device comprises two sealing points and is arranged between a turbo-machine shaft 12 carrying a rotor disk 11 and turbo-machine housing 13. Unnecessary details of the turbo-machine are not shown for purposes of clarity. The shaft 12 moves in oil-lubricated bearings 22. The sealing device prevents lubricating oil leaking from a lubricating-oil relief space 23 into a rotor disk space 24 and moves delivered medium from the rotor disk space 24 into the lubricating-oil relief space 23. A radially slotted sealing ring 14, 15 with a rectangular cross-section is provided for each of the sealing points and is fixed in the circumferential direction so as not to rotate. The non-rotating sealing rings 14, 15, bracing toward the outside, have their outer circumference rest sealingly in a shaft lead-through bore 18 and are arranged adjacent one another, in a common ring groove 19 in the shaft 12.

The sealing rings 14, 15 delimit a sealing-gas distributing space 20 in the form of a circumferential groove in the shaft lead-through bore 18 to which a known sealing gas can be admitted through a duct 2!. A joint 29 existing between facing lateral flanks of the sealing rings 14, 15 adjacent one another is approximately in the center of the sealing gas distributing space 20. A radial groove 16, 17 is developed at the facing lateral flanks of the respective sealing rings 14, 15. The radial groove 16, 17 ensures that sealing gas will enter into the sealing gas space 32 between the inside diameter of the sealing rings 14, 15 and the diameter of the base of the ring groove 19. The radial groove 16, 17 can be provided at the sealing rings 14, 15 in a simple manner by chamfering the opposite radial edges in the area of the gap 27, 28 at the joint 29.

The sealing ring 14 adjacent to the lubricating-oil relief space 23, is in the vicinity of a smaller diameter portion 25 of the lead-through bore 18 defining a rectangular gradation 26. At the start of operation of the turbo-machine, as illustrated in the sole figure, the pressure of the sealing gas forces the sealing ring 14 against the flank or sidewall 30 of the ring groove 19. A short axial distance then exists between the sealing ring 14 and the gradation 26.

After an initial wear at the sealing ring 14 with respect to the assigned groove flank 30 of the ring groove 19, the sealing ring 14 is pushed against the rectangular gradation 25 of further shaft lead-through bore 18. As a result of this axial support, the wear of the sealing ring 14 is stopped.

During the normal operation of the turbo-machine, the sealing ring 15 adjacent the rotor disk space 24 is in equilibrium between the sealing gas pressure and the pressure of the delivered medium in the rotor disk space 24. If an excessively low sealing gas pressure is caused by a malfunctioning of the sealing gas supply, the axial equilibrium at the sealing ring 15 is disturbed. The now predominant pressure of the delivered medium in the rotor disk space 24 displaces the sealing ring 15 axially against the sealing ring 14. If the sealing ring 14 does not yet rest against the gradation 26, wear will occur at the sealing ring 14 with respect to the groove flank 30 of the ring groove 19. As soon as the wear at the sealing ring 14 reaches the differential measurement between the groove flank 30 of the ring groove 19 and the rectangular gradation 26, however, both sealing rings 14, 15 are axially supported at the gradation 26. There will then be no further wear of the sealing rings 14, 15.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A sealing device between a shaft with a ring groove and a housing of a turbo-machine having at least one rotor disk, comprising two axially spaced sealing points which bound a sealing gas space adapted to be acted upon by sealing gas, and a sealing ring for each of said sealing points arranged in a common space of the ring groove of the shaft so as to rest, in a radially sealing manner, against a lead-through bore for the shaft, wherein the shaft lead-through bore, on a side of one sealing ring adjacent a bearing of the shaft, has a shoulder, and the one sealing ring, at the start of operation of the turbo-machine, rests against a side flange of the ring groove adjacent the bearing of the shaft and has a slight axial distance from the shoulder, wherein the two sealing rings are immediately adjacent one another in the common space of the ring groove so as to be able to abut one another, at least one radial groove is provided at the sealing rings on their lateral flanges facing one another, and a joint between the facing lateral flanks of the sealing rings is arranged in the area of a circumferential groove forming the sealing-gas space, in the shaft lead-through bore.

2. A sealing device according to claim 1, wherein the radial groove (16, 17) constitutes a chamfer of radial opposite edges in a gap (27, 28) of radial slots in the sealing ring (14, 15).

* * * * *